United States Patent [19]

Minowa

[11] Patent Number: 4,780,103

[45] Date of Patent: Oct. 25, 1988

[54] PARTIALLY DYED PLASTIC LENS AND METHOD OF MANUFACTURING SAME

[75] Inventor: Toshiaki Minowa, Sabae, Japan

[73] Assignee: Kabushiki Kaisha Minowa Gankyo, Fukui, Japan

[21] Appl. No.: 17,401

[22] Filed: Feb. 24, 1987

[30] Foreign Application Priority Data

Nov. 14, 1986 [JP] Japan .................. 61-269571

[51] Int. Cl.$^4$ ............ D06P 3/52; G02B 1/10; G02B 5/22; G02C 7/10
[52] U.S. Cl. ............................ 8/509; 8/464; 8/506; 8/507; 8/581; 351/162; 351/165
[58] Field of Search ............ 351/165; 8/506, 581, 8/615, 509, 464

[56] References Cited

U.S. PATENT DOCUMENTS 4,145,125  3/1979  Chika .................. 351/165

FOREIGN PATENT DOCUMENTS 53-24635  3/1978  Japan .
58/005716  1/1983  Japan .

*Primary Examiner*—A. Lionel Clingman
*Attorney, Agent, or Firm*—Armstrong, Nikaido, Marmelstein & Kubovcik

[57] ABSTRACT

A method for partially dyeing a plastic lens and plastic lens dyed by the method are herein disclosed, the method comprising forming a film of a nondyeable coating agent on the whole surface of the lens, cutting and removing at least part of the film and then immersing the plastic lens in a dyeing liquid to selectively dye the part of the lens from which the film is cut and removed, the method making it possible to provide a dyed lens having a clear boundary between the dyed and nondyed parts.

6 Claims, 1 Drawing Sheet

PARTIALLY DYED PLASTIC LENS AND METHOD OF MANUFACTURING SAME

BACKGROUND OF THE INVENTION

1. Field of the Invention

The present invention relates to a method for partially dyeing or tinting a plastic lens and a plastic lens dyed or tinted according to such method.

Recently, plastic lens have been widely been put into practical use because of their light weight properties, high impact resistance, high resistance to fracture, higher workability or the like compared with glass lenses. Plastic lenses have the further advantage that they can easily be dyed and for that reason, they have been dyed with a variety of colors to manufacture lenses having high fashionability.

Moreover, a plastic lens, only a part of which is dyed for the purposes of enhancing its fashionability and commercial merits or the like, has practically been manufactured and used.

2. Related Arts

A conventional method for partially dyeing a plastic lens comprises selectively applying a polymeric compound to only a part of the surface of the plastic lens other than that to be dyed and thus forming a film for masking whereby to prevent the surface from dyeing, dyeing the lens by dipping it in a dyeing bath and then removing the film for masking by, for instance, dissolving it with a dissolving agent. In this respect, reference is made to Laid-Open Japanese Utility Model Appln. Gazett No. 53-24635 (Appln. No. 51-106349).

However, the partially dyed plastic lens manufactured according to the aforementioned method including the use of the masking treatment suffers from the fact that it does not have a commercially acceptable and beautiful boundary between the dyed portion and the nondyed portion and is inadequate in sharpness of the boundary. Moreover, the conventional method for dyeing plastic lenses requires techniques of a high order and expensive which makes the resultant plastic lens more expensive.

SUMMARY OF THE INVENTION

The inventors of this invention have conducted various studies by overcoming the foregoing disadvantages is inherent in the conventional methods for dyeing plastic lenses, in particular, partially dyeing them. As a result, the inventors have found that these disadvantages can be eliminated by improving the manner for masking portions of plastic lens which are not intended to dye and completed the present invention.

Accordingly, the principal purpose of this invention is to provide a method for partially dyeing a plastic lens which permits the production of a plastic lens having sharp and beautiful boundary between the dyed portions and the nondyed portions.

Another purpose of this invention is to provide a plastic lens partially dyed with a variety of colors and having sharp and beautiful boundary between dyed portions and nondyed portions.

The above mentioned and other purposes according to the present invention can effectively be accomplished by providing a method for partially dyeing a plastic lens which comprises forming a film comprised of a nondyeable coating agent onto the whole surface of the plastic lens, cutting and removing at least part of the film of the coating agent and then immersing the plastic lens in a dyeing liquid to partially dye the surface of the plastic lens.

Plastic lenses as used in the present invention should be those capable of being dyed with a various kind of dyes or pigments and materials therefor include, for instance, polymethyl methacrylate, polycarbonate, poly-diethyleneglycol bis-allylcarbonate (hereunder referred to as "CR-39" for simplicity). Among these, the most preferred is CR-39 since plastic lenses made of CR-39 are particularly excellent in heat resistance, chemical resistance and workability when compared with other plastic lens.

A film of a coating agent which may be used in the present invention is any one of the conventionally known films of materials such as polysiloxane and fluorine-containing plastics. These coating agents may be applied to the surface of the lens according to any methods usually utilized, for instance, spraying and dipping methods.

According to the process of this invention, the film of the nondyeable coating agent is cut and removed at the portions of the lens to be dyed after the formation thereof. The cutting and removal of such film can be effected by using a cutting tool such as a hard metal bit and a diamond grindstone.

The film may be cut and removed at any part such as a peripheral side portion or a part of the lens surface according to the method of this invention. Moreover, the portions cut and removed may be designed so that plastic lens have a variety of dyed patterns, or designs such as a floral pattern or a pattern of initial letters. Thus, in the method of this invention, the form of the portions to be cut and removed may be designed so that plastic lens have a variety of dyed patterns, depending on the kinds of pattern.

The dyeing liquid which may effectively be used in the present invention cannot be restricted to those having specific compositions and may have any compositions capable of dyeing plastic lens. By way of illustration, a dyeing liquid has the following composition:

| Ingredients | Amount (g/l) |
| --- | --- |
| Azo type disperse dye | from 2 to 5 |
| Surfactant | from 1 to 10 |
| Dispersing agent | from 5 to 50 |
| Carrier solvent | from 10 to 30 |

In this case, water is, for instance, used as a solvent. When the plastic lens are dyed with such a dyeing liquid, the temperature of the dyeing liquid preferably falls within the range of from about 80° to 95° C.

On the other hand, after the film thereof is cut and removed in a desired pattern, the lenses to be dyed are immersed in a dyeing liquid maintained at a desired temperature and the time for immersing the lens, in general, various depending on different factors such as kinds of the film or the coating agent, the concentration and temperature of the dyeing liquid used and the intended degree of dyeing. The time for immersing is usually in the range of from several tens of seconds to two hours.

The plastic lenses thus processed are washed with, for instance, running water (tap water) sufficiently and dried to finish the intended plastic lenses having partially dyed portions or patterns.

Thus, according to the method of this invention, a film of a coating agent is first applied to the whole surface of the plastic lens to be partially dyed and then only the portions of the film dyed are cut and removed to obtain a plastic lens having a desired pattern or design to be dyed subsequently. Therefore, the boundary between portions of the lens to be dyed and those remained nondyed becomes quite sharp and plastic lens having a variety of dyed pattern can effectively or easily be produced if properly selecting the sites, on the film serving as a mask, to be cut and removed.

Furthermore, a plastic lens having a variety of dyed patterns or designs, which are dyed with different colors respectively, may be produced according to the method of this invention by repeating the steps of the method.

BRIEF DESCRIPTION OF THE DRAWINGS

The method for partially dyeing plastic lens and plastic lens partially dyed according to the present invention will be explained in detail referring to the accompanying drawings; wherein.

PREFERRED EMBODIMENT OF THE INVENTION

Figure 1:
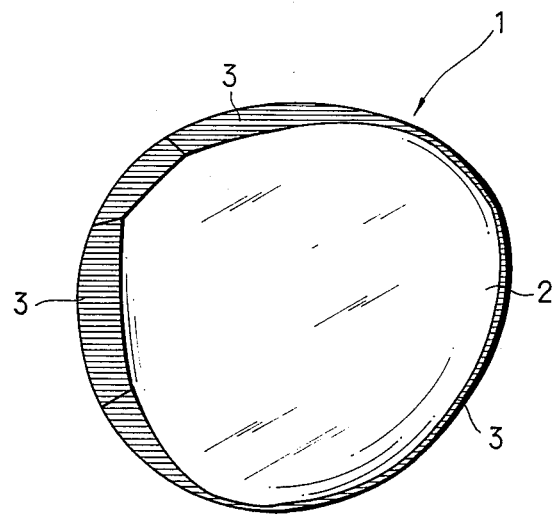
FIG. 1 is a plan view schematically illustrating an example of a plastic lens partially dyed according to the method of this invention.

The method according to the present invention will now be described in more detail with reference to the following Examples, however, it is not intended to restrict the scope of the present invention to those specific Examples.

EXAMPLE 1

To a mixture of methyltriethoxysilane (100 parts by weight), vinylmethoxysilane (100 parts by weight), tetraethoxy silicate (50 parts by weight) and ethanol (300 parts by weight), there was added 0.01N hydrochloric acid aqueous solution while stirring to form a uniform hydrolyzate partially condensed and the resulting product was allowed to stand for a whole day and night to stabilize it. Thereafter, 60 parts by weight of acetic acid and 3 parts by weight of a silicone type surfactant (SF8421, TORAY SILICONE K.K.) were added to the product followed by sufficiently stirring at normal temperature and then allowed to stand for two days to obtain a coating liquid.

A plastic lens 1 of CR-39, which was previously subjected to a pretreatment such as sufficient washing or the like, was mentioned in the aforementioned coating liquid. The lens 1 dipped in the coating liquid was then subjected to a primary drying treatment in circulating hot-air drier adjusted to 80° C. and then a secondary drying treatment in a circulating hot-air drier adjusted to 120° C. for 3 hours to cure the coating liquid 3 applied to the lens surface.

The peripheral side 3 of the lens 1 thus obtained having the film of nondyeable coating agent formed thereon was removed by cutting the film with a diamond grindstone and then the portions 3 was polished with a high speed buff to become transparent.

The resultant lens 1 was dyed under the following dyeing conditions:

DYEING CONDITIONS (i) Composition of the Dyeing Bath
  ML color blue (manufactured and sold by MITSUI TOATSU DYES Co. Ltd.): 5 g
  Pure Water: 1
(ii) Bath Temperature: 90° C.
(iii) Dyeing Time: 15 min.

As a result, the lens 1 was dyed with clear blue only at the periphery 3 thereof from which the film was cut and removed, as shown in the attached FIG. 1. It was found that the resulting lens 1 had a high commercial merit and an excellent fashionability.

EXAMPLE 2

A mixture of r-methacryloxypropyl trimethoxysilane (100 parts by weight), vinyltriethoxysilane (100 parts by weight) and ethanol 200 parts by weight) was hydrolyzed with 0.02N hydrochloric acid aqueous solution and allowed to stand for a whole day and night to obtain a uniform colorless transparent solution. Then 50 parts by weight of trimellitic acid and 2 parts by weight of a silicone type surfactant (KF351, Shin-Etsu Chemical Co., Ltd.) were added to the above transparent solution and the mixture was stirred at normal temperature for 3 hours, followed by leaving at rest for two days to obtain a coating liquid.

A lens 1 of methyl methacrylate, which was previously subjected to a pretreatment such as sufficient washing or the like, was immersed in the above mentioned coating liquid and thereafter the coating liquid applied on the lens 1 was cured for 5 hours in a circulating hot air drying oven controlled to 80° C.

Figure 2:
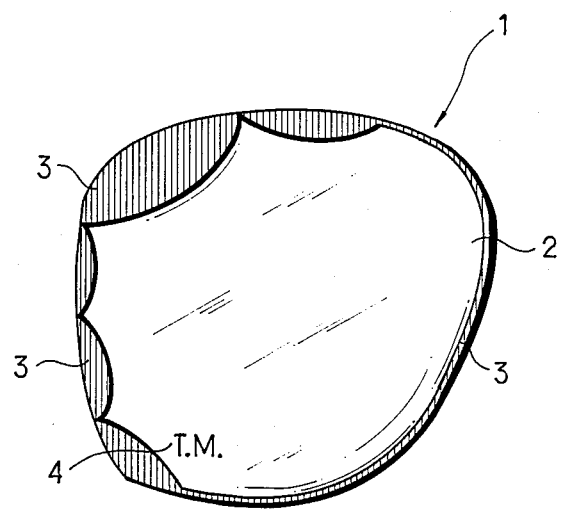
FIG. 2 is a diagram similar to that in FIG. 1 and schematically illustrating another example of a plastic lens partially dyed according to the method of this invention.

The film at the peryphery 3 of the resultant lens was cut and removed in a desired pattern and the film on the surface of the lens 1 was cut and removed in the form of initial letters 4 (eq. T.M. see the attached FIG. 2), with utilizing a hard metal bit.

This lens 1 was then dyed according to the following conditions:

DYEING CONDITIONS (i) Composition of the Dyeing Bath
  Disperse dye: Dianix Red (manufactured and sold by MITSUBISHI KAESI IND. INC.): 4 g
  Surfactant: Sun Salt 7000 (manufactured and sol by NIKKA CHEMICALS IND. INC.): 2 g
  Dispersing Agent: Dispertex (ditto): 30 g
  Benzyl alcohol: 16 g
  Pure Water: 1
(ii) Bath Temperaturee: 80° C.
(iii) Dyeing Time: 2 min.

Accordingly, the periphery and the initial letters 4 on the lens 1 were dyed with pink and they were embossed on the lens 1. It was likewise found that the lens had a high commercial merit and an excellent fashionability.

In the above Examples, a so-called hard coating agent which provides a polysiloxane type film was used as the coating agent, however it is appreciated that the coating agent as used herein is not restricted to this kind of coating agents.

For example, a coating agent which provides an organic film or an inorganic film nondyeable may also be utilized in the present invention. In certain cases, the film of a coating agent applied to a lens should be removed after dyeing the lens.

Thus, according to the method for partially dyeing plastic lens of the present invention, a plastic lens dyed has a clear boundary between dyed portions and nondyed portions of the lens, since the film existing at the portions of the lens to be dyed can exactly be cut and processed.

Moreover, if a so-called hard coating agent providing, for instance, polysiloxane type film is used as the coating agent, the film applied to a lens is not necessarily be pealed off after the dyeing of the lens and this makes the manufacturing process more easier or simpler.

In the method of this invention, portions of a lens to be dyed and the form thereof can be selected freely and therefore, a plastic lens having a variety of patterns or designs dyed can easily be provided.

In addition, the method of this invention can be applied to concave or convex lens or flat lens for sun glasses or fashion glasses.

What is claimed is:

1. A method for partially dyeing a plastic lens, which comprises forming a film of a masking coating agent on the whole surface of the plastic lens, cutting and removing at least a portion of the film of the coating agent and then immersing the lens in a liquid bath containing a dye capable of dyeing the plastic lens and incapable of dyeing the coating agent, thereby dyeing the portion of the lens from which the film was cut and removed.

2. The method for partially dyeing a plastic lens as claimed in claim 1, wherein the plastic lens is composed of polydiethyleneglycol bis-allylcarbonate.

3. The method for partially dyeing a plastic lens as claimed in claim 2, wherein the coating agent is is a polysiloxane.

4. The method for partially dyeing a plastic lens as claimed in claim 3, wherein the coating agent is prepared by mixing 100 parts by weight of methyltriethoxysilane, 100 parts by weight of vinyltrimethoxysilane, 50 parts by weight of tetraethoxy silicate and 300 parts by weight of ethanol, adding thereto 0.01N hydrochloric acid to to cause partial hydrolysis and condensation, and then adding to the reaction mixture 60 parts by weight of acetic acid and 3 parts by weight of a silicone type surfactant, and stirring the mixture.

5. The method for partially dyeing a plastic lens as claimed in claim 3, wherein the coating composition is prepared by hydrolyzing a mixture comprising 100 parts by weight of r-methacryloxypropyltrimethoxysilane and 100 parts by weight of vinyltrimethoxysilane dissolved in 200 parts by weight of ethanol with 0.02N hydrochloric acid and then adding to the resulting hydrolyzate 50 parts by weight of trimellitic acid and 2 parts by weight of a silicone type surfactant, and stirring the mixture.

6. The method for partially dyeing a plastic lens as claimed in claim 1, wherein the temperature of the dyeing liquid is in the range of from about 80° to 95° C.

* * * * *